United States Patent
Ruder

(10) Patent No.: US 8,167,343 B2
(45) Date of Patent: May 1, 2012

(54) DEVICE FOR ATTACHMENT OF A BUMPER COVERING

(75) Inventor: Jürgen Ruder, Kösching (DE)

(73) Assignee: Peguform GmbH, Bötzingen (DE)

( * ) Notice: Subject to any disclaimer, the term of this patent is extended or adjusted under 35 U.S.C. 154(b) by 0 days.

(21) Appl. No.: 12/891,387

(22) Filed: Sep. 27, 2010

(65) Prior Publication Data

US 2011/0080013 A1 Apr. 7, 2011

(30) Foreign Application Priority Data

Oct. 1, 2009 (DE) ............ 20 2009 013 149 U

(51) Int. Cl.
*B60R 19/24* (2006.01)
(52) U.S. Cl. ............ 293/120; 293/121; 293/155
(58) Field of Classification Search ............ 296/187.09, 296/193.09, 29; 293/102, 120, 155, 121
See application file for complete search history.

(56) References Cited

U.S. PATENT DOCUMENTS

| | | | | |
|---|---|---|---|---|
| 4,679,837 A | * | 7/1987 | Bayer et al. ............ | 293/102 |
| 4,974,891 A | * | 12/1990 | Furuta ............ | 293/104 |
| 5,108,138 A | * | 4/1992 | Kawaguchi ............ | 293/120 |
| 6,010,169 A | * | 1/2000 | Cox et al. ............ | 293/120 |
| 6,135,517 A | * | 10/2000 | Cordebar ............ | 293/155 |
| 6,764,119 B2 | * | 7/2004 | Bladow et al. ............ | 293/155 |
| 6,959,950 B2 | * | 11/2005 | Bladow et al. ............ | 293/155 |
| 7,144,059 B2 | * | 12/2006 | Pfister et al. ............ | 296/29 |
| 7,258,383 B2 | * | 8/2007 | Pfister et al. ............ | 296/29 |
| 7,303,219 B2 | * | 12/2007 | Trabant et al. ............ | 293/155 |
| 7,793,998 B2 | * | 9/2010 | Matsui et al. ............ | 293/154 |

FOREIGN PATENT DOCUMENTS

| | | |
|---|---|---|
| DE | 20 2004 020 237 U1 | 3/2005 |
| DE | 20 2008 001 814 U1 | 6/2009 |
| EP | 2 072 342 | 6/2009 |
| FR | 2 919 848 | 2/2009 |

* cited by examiner

*Primary Examiner* — Glenn Dayoan
*Assistant Examiner* — Gregory Blankenship
(74) *Attorney, Agent, or Firm* — Ursula B. Day

(57) ABSTRACT

The invention concerns a device which is based on thermoplastic material for the attachment of a bumper covering at the body of a motor vehicle which includes a base body and a cover plate as well as a security pin for securing the cover plate; the base body and the cover plate are configured as separate components and the security pin when inserted into safety lugs at the base body locks the cover plate in place.

7 Claims, 3 Drawing Sheets

DEVICE FOR ATTACHMENT OF A BUMPER COVERING

CROSS-REFERENCES TO RELATED APPLICATIONS

This application claims the priority of German Patent Application Serial No. 20 2009 013 149.1, filed Oct. 1, 2009, pursuant to 35 U.S.C. 119(a)-(d), the subject matter of which is incorporated herein by reference.

BACKGROUND OF THE INVENTION

The present invention relates to a device for the attachment of a bumper covering at the body of a motor vehicle, and in particular to a device that includes a base body, a cover plate and a security pin.

A generic mounting system for bumpers is for example described in DE 20 2008 001 814 U1, where a holding strip, which is configured as a C-track, is fixed at an attachment edge of a first component and the second component includes an attachment edge with positioning domes as an attachment eyelet, whereby the positioning domes are inserted into corresponding attachment openings in the attachment edge of the first component and reinforced with the holding strip.

A drawback of this arrangement lies in the fact that the components must fulfill certain conditions so that they can be used in the mounting systems. Thus, this system is only suited for construction components that include elongated and bracket-type abutment surfaces for the creation of a proper connection.

Thus, there is a need to provide an attachment system, in particular for bumper coverings which permits their mounting in a simple and fast manner, and wherein such an attachment system need not meet special geometrical requirements for the attachment system components and such an attachment system with fewer requirements can be utilized universally in a variety of motor vehicles.

It would therefore be desirable and advantageous to provide an improved attachment system to obviate prior art shortcomings and to provide a system that is more universally useful.

SUMMARY OF THE INVENTION

According to one of the aspects of the present invention an attachment system is provided which includes a device based on thermoplastic material for the attachment of a bumper covering at the body of a motor vehicle.

The device according to the present invention for the attachment at a motor vehicle body includes a base body with an attachment surface at its rear wall for attachment to the body of a motor vehicle and a front wall with two safety lugs arranged co-axially to each other and perpendicular to the rear wall, a cover plate corresponding to the front wall of the base body, and a security pin for inserting through the safety lugs; wherein the base body and the cover plate are configured as separate components and through insertion of the security pin through the safety lugs the cover plate is locked into place.

The base body, at its front wall includes at least two safety lugs that can be ring-shaped.

Base body and cover plate are configured as separate components. However, in an advantageous embodiment, the safety bolt can be produced so it is connected to the base body or also to the cover plate, and during assembly of the attachment system can be easily manually separated from the corresponding component. Since according to the present invention, all assembly components are from thermoplastic material and manufactured via an injection molding process, the security pin can be easily injection molded directly onto the base body or the cover plate with a predetermined rupture line or a plastic thread. When mounting the device, the pin is then manually separated from base body or cover plate. This has the advantage that the pin is available at all times during assembly and does not get lost or is being mistakenly used for another assembly. In addition, this measure helps to remember in properly placing the security pin during assembly.

The base body is attached to the body of the motor vehicle in such a way that during assembly a flange disposed at the bumper covering is placed between the base body and the cover plate and attached to the base body by the cover plate and the assembly then locked by inserting the pin through the safety rings.

Besides the base plate, the cover plate can also be provided with safety lugs, such as for example safety rings or other receiving devices for receiving the security pin.

In an advantageous embodiment of the present invention for assembly it is contemplated that the cover plate is premounted on the flange of the bumper and subsequently is clamped together with the flange onto the base body. After that, the entire mount is locked by the security pin.

The assembly is configured such that the bumper covering either from the front or from the rear, depending of whether it is a front bumper or a rear bumper can be mounted onto the base body by a simple plug-in action. Of course, the entire concept will provide corresponding means which allow the attachment device, after pre-mounting, be accessible for the insertion from the exterior. This can be realized, for example, in that the attachment device is arranged in the area of the car head- or tail light openings in which case the lights are mounted only after the bumper covering has been mounted.

A special advantage of the attachment arrangement according to the present invention is found in that the principle of the attachment system is universally applicable and can be utilized with different models of motor vehicles by making slight adjustments. Since the base body and the cover plate are configured as separate components, the cover plate can already be pre-mounted on the flange of the bumper covering, and the mounting and dismounting of the bumper covering can be carried out with a few simple motions and without the need for any additional tools.

As afore-described, it is contemplated that the components are produced from thermoplastic material by means of injection molding utilizing the usual thermoplastic materials from the group of polypropylene (PP), polyethylene (PE), polybutyleneterephthalate (PBT), polyamide (PA), polystyrene, (PS) polycarbonate (C), polymethylmethacrylate (PMMA), acrylnitril-butadiene-stryrene (ABS), acrylnitril-butadiene-styrene-polycarbonate-copolymerisate (ABS-PC) or polyoxymethylene (POM). Of course, it is also possible to reinforce these components with fibers such as glass fibers, carbon fibers or other reinforcement materials.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
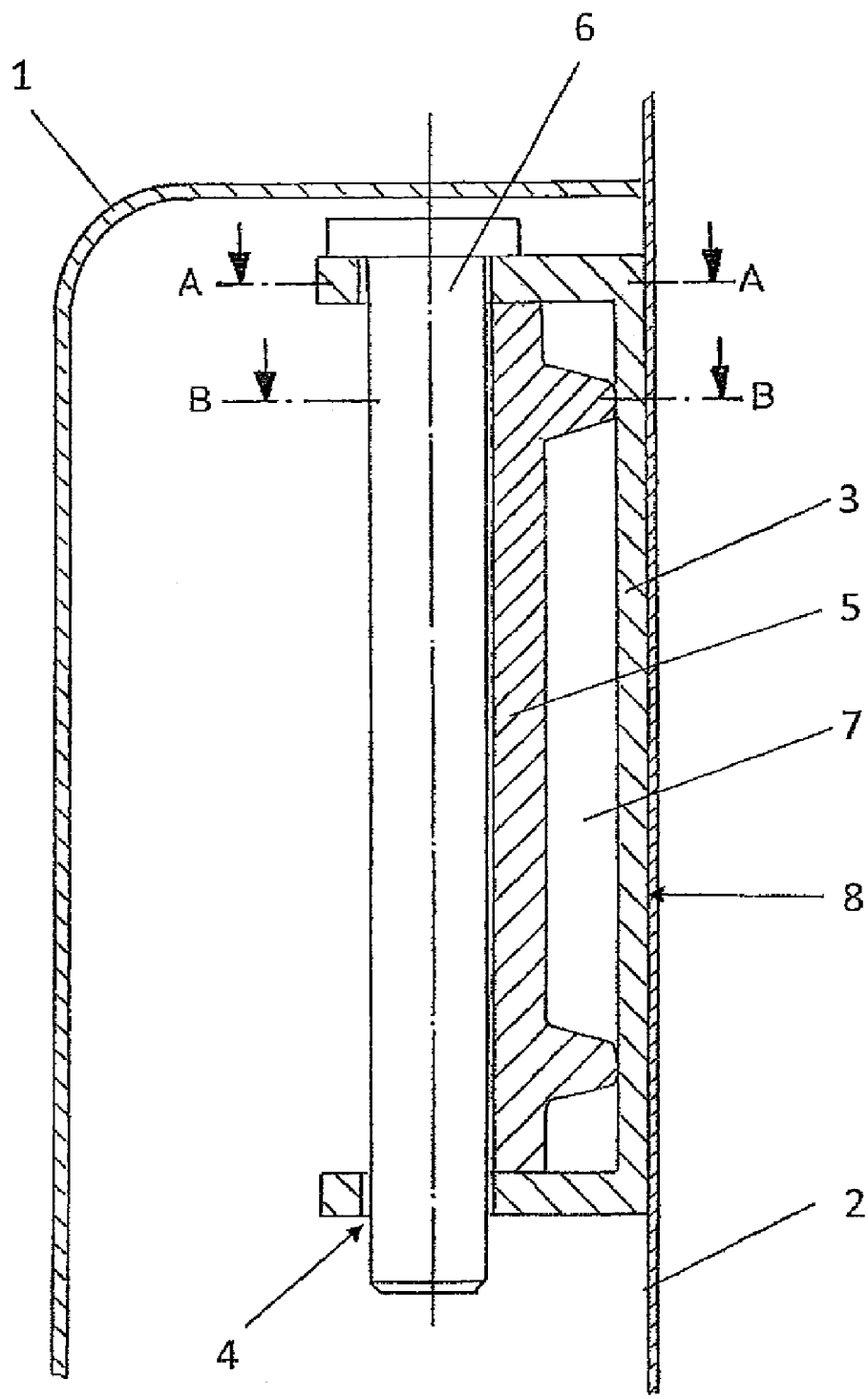
FIG. 1 is a view of a section of the attachment system according to the present invention wherein the section is shown in the driving direction (Y-section)

Throughout all the Figures, same or corresponding elements are generally indicated by same reference numerals.

Figure 3:
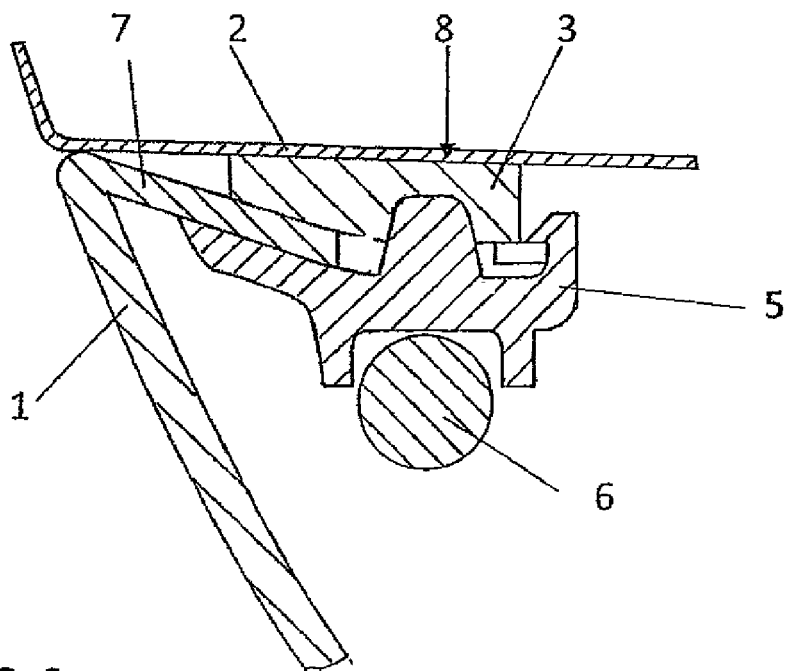
FIG. 3 is a top view of a section of the attachment system (Z-section/plane B-B).

In the section view of FIG. 1 (Y section), the attachment system for the bumper covering 1 is seen during assembly. The rear wall of the base body 3 is attached at the body 2 of the motor vehicle. As seen in FIG. 3, flange 7 of the bumper covering 1 is clamped between base body 3 and cover plate 5, and the entire bumper covering 1 is fixed by means of the cover plate 5 on the base body. The final locking of the attachment system is realized by means of the security pin 6, which is inserted through the two safety rings 4 disposed at the front wall of the base body 3 and project perpendicular to the attachment surface of the base body 3 in driving direction.

Figure 2:
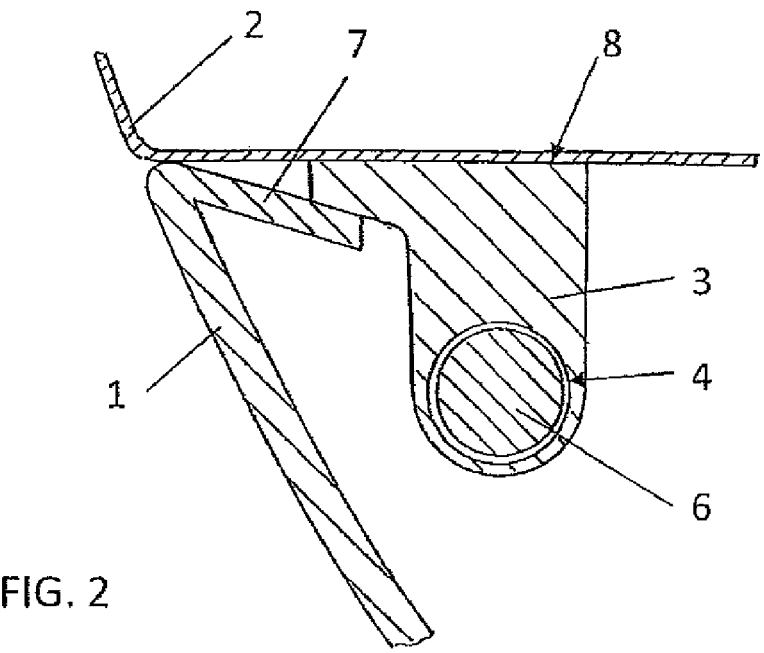
FIG. 2 is a top view of a section of the attachment system (Z-section/plane A-A)

FIG. 2 is a top view of the attachment system according to the present invention and here it is likewise shown as a section along plane A-A of FIG. 1, wherein the rear wall 8 of base body 3 is attached directly at the body 2 of the motor vehicle. Flange 7 of the bumper covering 1 abuts base body 3. The security pin 6 is inserted through the safety ring 4 and secures in that manner the entire attachment system.

FIG. 3 shows the attachment system according to the present invention in a top view also as a section along section plane B-B of FIG. 1, wherein the rear wall 8 of base body 3 is shown arranged directly at the body 2 of the motor vehicle. Flange 7 of the bumper covering 1 is clamped between base body 3 and cover plate 5. From this figure, it is seen that it is especially advantageous when the cover plate 5 is pre-mounted at flange 7 of the bumper covering 1 and is subsequently simply plugged in the base body 3. the cover plate is then secured with security pin 6.

Figures 4A, 4B:
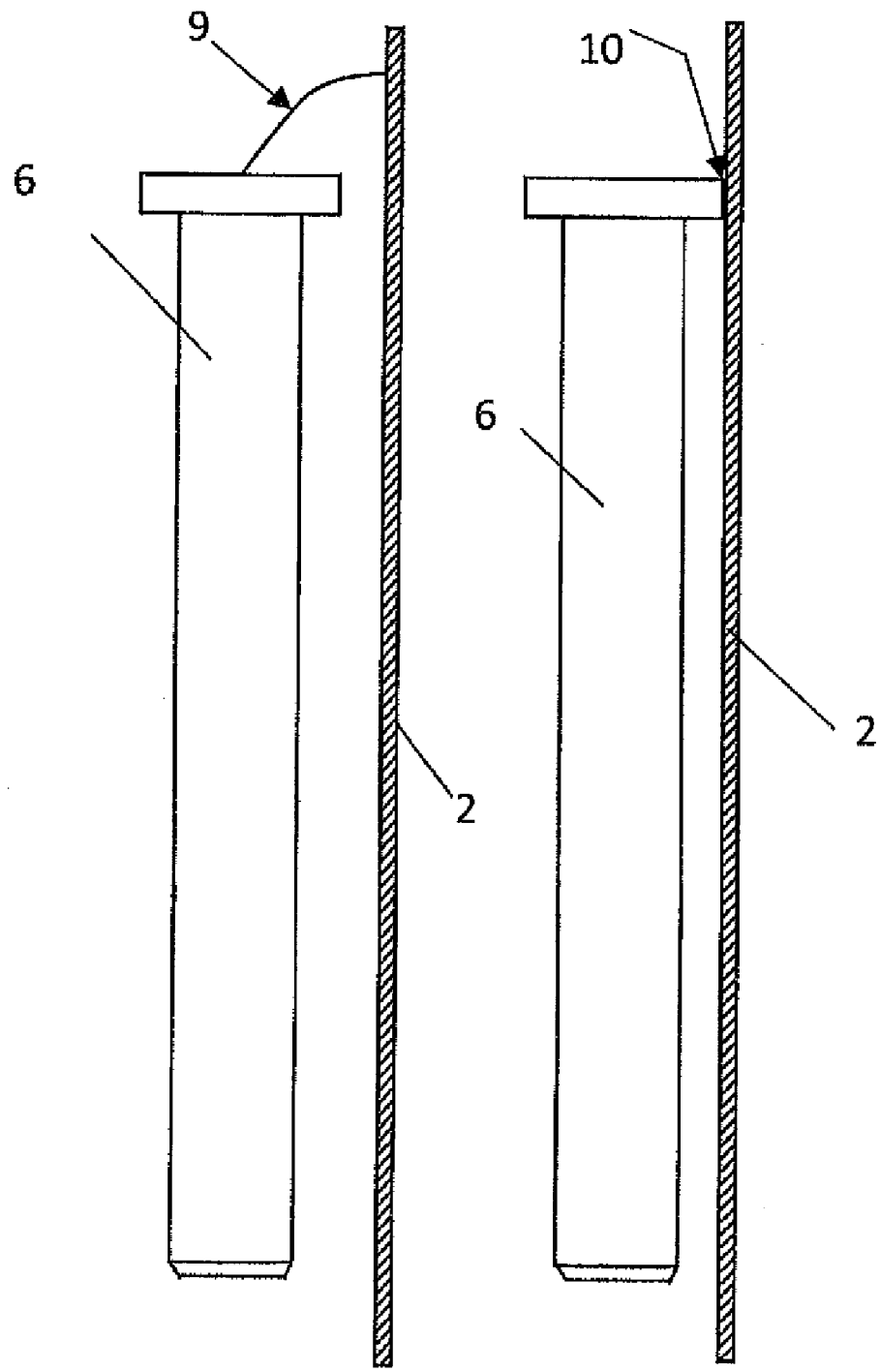
FIGS. 4a and 4b depict a side view each of the security pin held captive by a thread respectively through a rupture line at the body of the motor vehicle.

FIGS. 4a and 4b show how the security pin 6 that is held captive either on a thread or through a rupture line at the body of the motor vehicle prior to assembly.

While the invention has been illustrated and described as embodied in an attachment system for bumper covering, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An attachment device of thermoplastic material for attaching a bumper covering to the body of a motor vehicle comprising:
    a base body having a rear wall for attachment to a body of a motor vehicle and a front wall with two safety lugs arranged co-axial to each other and perpendicular to the rear wall;
    a cover plate corresponding to the front wall of the base body, and
    a security pin for inserting through the safety lugs; wherein the base body and the cover plate are configured as separate components and through insertion of the security pin through the safety lugs the cover plate is locked into place, wherein a flange of the bumper covering is arranged between the base body and the cover plate.

2. An attachment device of thermoplastic material for attaching a bumper covering to the body of a motor vehicle comprising:
    a base body having a rear wall for attachment to a body of a motor vehicle and a front wall with two safety lugs arranged co-axial to each other and perpendicular to the rear wall;
    a cover plate corresponding to the front wall of the base body, and
    a security pin for inserting through the safety lugs; wherein the base body and the cover plate are configured as separate components and through insertion of the security pin through the safety lugs the cover plate is locked into place, wherein the security pin before insertion is held captive at the base body or the cover plate via a rupture line or a plastic thread and separable from either the base body or the cover plate.

3. The device of claim 1, wherein the cover plate includes means for receiving the security pin.

4. An attachment device of thermoplastic material according to claim 1, wherein the cover plate is configured for mounting the cover plate at the flange of the bumper covering, and for fixing the cover plate together with the flange at the base body.

5. An attachment device of thermoplastic material for attaching a bumper covering to the body of a motor vehicle comprising:
    a base body having a rear wall for attachment to a body of a motor vehicle and a front wall with two safety rings arranged co-axial to each other and perpendicular to the rear wall;
    a cover plate corresponding to the front wall of the base body, and
    a security pin for inserting through the safety lugs; wherein the base body and the cover plate are configured as separate components and through insertion of the security pin through the safety lugs the cover plate is locked into place, wherein a flange of the bumper covering is arranged between the base body and the cover plate; wherein in an assembled state, the cover plate is locked by the security pin inserted through safety rings.

6. The device of claim 2, wherein the cover plate includes means for receiving the security pin.

7. An attachment device of thermoplastic material according to claim 2, wherein the cover plate is configured for mounting the cover plate at the flange of the bumper covering, and for fixing the cover plate together with the flange at the base body.

* * * * *